Patented Dec. 2, 1941

2,264,870

UNITED STATES PATENT OFFICE 2,264,870

VULCANIZATION OF RUBBER

David J. Beaver, Nitro, W. Va., assignor to Monsanto Chemical Company, St. Louis, Mo., a corporation of Delaware No Drawing. Application November 5, 1938, Serial No. 239,026

14 Claims. (Cl. 260—787)

The present invention relates to the vulcanization of rubber by an improved process wherein there is employed in the vulcanization step an isothiohydantoin. The compounds of the present invention are particularly adaptable for use in rubber in conjunction with an accelerator of a different class thereby forming a mixed accelerator.

The isothiohydantoins of the present invention are preferably employed in conjunction with a thiazole accelerator. Examples of thiazole accelerators which are so employed comprise 2-mercaptobenzothiazole and salts thereof, dibenzothiazyl disulfide, 2-mercapto 4-phenyl benzothiazole, benzothiazylthiobenzoate, 2,4 dinitrophenyl - benzothiazylsulfide, di(benzothiazyl thiol) dimethyl urea, mercaptotolylthiazole, mercaptonaphthothiazole, cyclohexylamino 2-thiobenzothiazole and the condensation product of equi-molecular proportions of 2-mercaptobenzothiazole and hexamethylenetetramine.

The compounds of the present invention comprise the structure

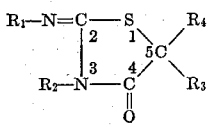

where the substituents designated as $R_1$, $R_2$, $R_3$ and $R_4$ may be hydrogen or aryl, alkyl, alicyclic or aralkyl groups.

The isothiohydantoins may be prepared conveniently by the action of a thiourea on an aliphatic carboxylic acid containing a halogen substituent in the alpha position. For example, the action of mono chlor acetic acid on thiourea results in the formation of isothiohydantoin, which reaction was described by J. Volhard (Ann. Chem. Pharm. vol. 166, p. 383 (1873)). The structure of the isothiohydantoins was established by C. Liebermann and A. Lange who published their conclusions and the basis therefor in Berichte der Deutschen Chemischen Gesellschaft, vol. 12, p. 1588 (1879). They showed that the condensation product described by Volhard, of monochloracetic acid and thiourea, possessed the structure

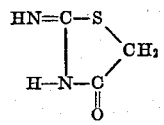

Although where convenient or desirable other methods may be employed, the reaction of a thiourea and an alpha halogenated aliphatic acid affords a satisfactory method for the preparation of the preferred class of compounds. The following example illustrates their preparation in greater detail and is to be understood as illustrating the invention and not limitative thereof.

Equi-molecular proportions of monochloracetic acid and thiourea were placed in a suitable container and gently heated to approximately 70° C. whereupon a strong exothermic reaction set in and the temperature rose to approximately 140° C. Heating was continued for a short time until the reaction was substantially complete and the crude isothiohydantoin so formed was purified by recrystallization from hot water. Any free acid present in the hot water solution was neutralized with dilute alkali before precipitating the isothiohydantoin. The melting point of the dry product was 225–230° C.

It is evident that a variety of isothiohydantoins, wherein one or more hydrogen atoms in the above formula of isothiohydantoin are replaced by other substituents, may be obtained by reacting substituted thioureas, as for example, mono phenyl thiourea, mono butyl thiourea, di(o-biphenyl) thiourea, diphenyl thiourea, di-o-tolyl thiourea, dibenzyl thiourea, diamyl thiourea and di-p-anisidyl thiourea, with an aliphatic carboxylic acid containing a halogen substituent in the alpha position. For example mono phenyl thiourea was reacted with monochloracetic acid in the manner hereinbefore described. The reaction taking place is believed to be represented by the following equation:

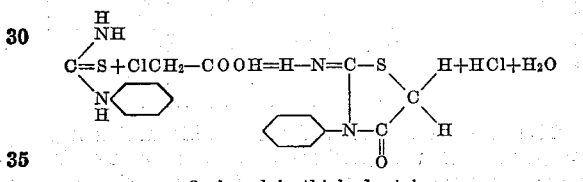

3 phenyl isothiohydantoin

By starting with diphenyl thiourea the hydrogen on both the nitrogen atoms of isothiohydantoin is replaced, as shown by the following:

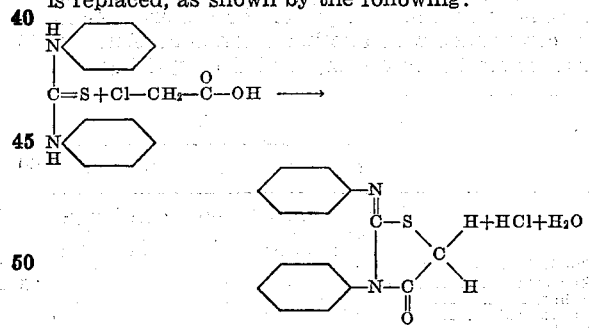

2 phenyl imino, 3 phenyl isothiohydantoin

Acids other than chloracetic acid may be employed such as, for example, alpha chlorpropionic acid, alpha chlor secondary butyric acid, alpha brom caproic acid and phenyl monochloracetic acid whereby, upon reacting with a thiourea, one or both of the hydrogen atoms attached to carbon in isothiohydantoin are replaced by other substituents.

Although a convenient reaction for the preparation of the isothiohydantoins of the present invention has been described in some detail, it is to be understood that this invention is not limited to any method of preparation but pertains broadly to the isothiohydantoins regardless of the method or means employed in obtaining them.

The following specific embodiments of the invention illustrate the desirable properties of the preferred class of materials and are in no sense limitative of the broad invention as embodied above. Rubber stocks were compounded comprising

|  | Stock | |
| --- | --- | --- |
|  | A | B |
|  | Parts by weight | Parts by weight |
| Smoked sheets of rubber | 100 | 100 |
| Zinc oxide | 10 | 10 |
| Sulfur | 3 | 3 |
| Stearic acid | 0.5 | 0.5 |
| Mercaptobenzothiazole | 0.6 | 0.6 |
| Isothiohydantoin |  | 0.25 |

The stocks so compounded were vulcanized by heating for different periods of time in a press at the temperature of thirty pounds steam pressure per square inch and the following modulus and tensile properties were obtained on testing the cured rubber products.

*Table I*

| Stock | Cure, time in minutes | Modulus of elasticity in lbs./in.$^2$ at elongations of— | | Tensile at break in lbs./in.$^2$ | Ult. elong., percent |
| --- | --- | --- | --- | --- | --- |
|  |  | 500% | 700% |  |  |
| A | 15 | 186 | 745 | 1,760 | 855 |
| B | 15 | 232 | 875 | 2,000 | 865 |
| A | 30 | 282 | 1,200 | 2,300 | 830 |
| B | 30 | 340 | 1,350 | 2,650 | 820 |
| A | 45 | 355 | 1,435 | 2,460 | 805 |
| B | 45 | 400 | 1,560 | 2,680 | 800 |
| A | 60 | 371 | 1,520 | 2,600 | 800 |
| B | 60 | 428 | 1,700 | 2,820 | 790 |
| A | 90 | 376 | 1,450 | 2,520 | 805 |
| B | 90 | 423 | 1,600 | 3,210 | 820 |

The above data show the desirable activating properties of the preferred class of materials when employed in conjunction with a thiazole accelerator, for example mercaptobenzothiazole itself. Other thiazole accelerators may likewise be employed. As a specific embodiment of the invention showing the use of the preferred class of compounds with another thiazole accelerator, rubber stocks were compounded comprising

|  | Stock | | | | |
| --- | --- | --- | --- | --- | --- |
|  | C | D | E | F | G |
|  | Parts by weight | Parts by weight | Parts by weight | Parts by weight | Parts by weight |
| Smoked sheets of rubber | 100 | 100 | 100 | 100 | 100 |
| Zinc oxide | 10 | 10 | 10 | 10 | 10 |
| Sulfur | 3 | 3 | 3 | 3 | 3 |
| Stearic acid | 0.50 | 0.50 | 0.50 | 0.50 | 0.50 |
| Cyclohexylamino 2 thio benzothiazole | 0.25 | 0.25 | 0.25 | 0.25 | 0.25 |
| Isothiohydantoin |  | 0.25 |  |  |  |
| 3 phenyl isothiohydantoin |  |  | 0.25 |  |  |
| 2 o-biphenyl imino, 3 o-biphenyl isothiohydantoin |  |  |  | 0.25 |  |
| 2 phenyl imino, 3 phenyl isothiohydantoin |  |  |  |  | 0.25 |

The stocks so compounded were vulcanized by heating for different periods of time in a press at the temperature of twenty pounds steam pressure per square inch and the following modulus and tensile properties were obtained on testing the cured rubber products.

*Table II*

| Stock | Cure, time in minutes | Modulus of elasticity in lbs./in.$^2$ at elongations of— | | Tensile at break in lbs./in.$^2$ | Ult. elong., percent |
| --- | --- | --- | --- | --- | --- |
|  |  | 300% | 500% |  |  |
| C | 45 | 170 | 290 | 3,125 | 820 |
| D | 45 | 145 | 380 | 3,140 | 805 |
| E | 45 | 155 | 410 | 3,120 | 810 |
| F | 45 | 180 | 400 | 2,945 | 800 |
| G | 45 | 155 | 395 | 3,000 | 785 |
| C | 60 | 210 | 455 | 2,700 | 790 |
| D | 60 | 205 | 540 | 3,720 | 790 |
| E | 60 | 195 | 545 | 3,580 | 790 |
| F | 60 | 205 | 550 | 3,680 | 790 |
| G | 60 | 210 | 575 | 3,520 | 765 |
| C | 90 | 240 | 535 | 3,775 | 755 |
| D | 90 | 230 | 725 | 3,680 | 735 |
| E | 90 | 230 | 705 | 4,175 | 765 |
| F | 90 | 250 | 735 | 3,760 | 735 |
| G | 90 | 230 | 700 | 4,000 | 750 |

The desirable activating properties of the preferred class of materials when employed in conjunction with thiazole accelerators are clearly shown by the modulus figures at 500% elongation set forth in the above table. In addition the above uncured stocks containing the preferred class of materials showed no "set-up" or prevulcanization when tested with a Williams Plastometer described by Williams, Industrial and Engineering Chemistry for 1924 (vol. 16, p. 362—see also Krall ibid, vol. 16, p. 922) after heating for 480 minutes at 200° F.

As a further specific embodiment of the invention showing the use of the preferred class of materials with another typical thiazole accelerator, a rubber stock was compounded comprising

| Stock H, parts by weight | |
| --- | --- |
| Smoked sheets of rubber | 100 |
| Zinc oxide | 5 |
| Sulfur | 3 |
| Stearic acid | 0.50 |
| Di(benzothiazylthiol) dimethyl urea | 0.60 |
| Isothiohydantoin | 0.1 |

The stock so compounded was vulcanized by heating in a press at the temperature of twenty pounds steam pressure per square inch. The modulus and tensile properties of the cured rubber stock are given below.

*Table III*

| Stock | Cure, time in minutes | Modulus of elasticity in lbs./in.$^2$ at elongations of— | | Tensile at break in lbs./in.$^2$ | Ult. elong., percent |
| --- | --- | --- | --- | --- | --- |
|  |  | 500% | 700% |  |  |
| H | 30 | 109 | 304 | 1,370 | 1,020 |
| H | 45 | 168 | 606 | 1,970 | 965 |
| H | 60 | 256 | 963 | 2,395 | 885 |
| H | 90 | 370 | 1,255 | 2,580 | 835 |

The above data show the desirable modulus and tensile properties obtained by the use of the preferred accelerator combinations.

The preferred accelerator combinations are useful in other rubber compositions than those hereinabove shown and may be employed in compositions wherein the vulcanization step is carried out in a different manner. For example, the isothiohydantoins are particularly applicable as activators in dry heat cures. They are resistant to discoloration, producing neutral colored cured stocks and this, in conjunction with their striking characteristic of giving satisfactory activation of thiazole accelerators without the accompanying disadvantage of scorching, makes possible the attainment of a maximum of desirable physical properties and greatly extends the usefulness of the preferred materials. For example isothiohydantoins may be incorporated into white rubber products where many materials, otherwise desirable, are not suitable because they discolor the cured rubber products.

As a specific embodiment of the invention further showing the improved results obtainable by the use of the preferred class of materials, a rubber stock was compounded comprising J, parts by weight

| | |
|---|---|
| Pale crepe rubber | 100 |
| Zinc oxide | 5 |
| Whiting | 60 |
| Sulfur | 2 |
| "Laurex" | 0.25 |
| Cyclohexylamino 2 thiobenzothiazole | 1.0 |
| Isothiohydantoin | 0.4 |

The rubber stock so compounded was vulcanized by curing in dry heat at a temperature of 250° F. for 60 and 75 minutes respectively. The modulus and tensile properties of the cured rubber product are given below.

Table IV

| Stock | Cure, time in minutes | Modulus of elasticity in lbs./in.$^2$ at elongations of— | | Tensile at break in lbs./in.$^2$ | Ult. elong., percent |
|---|---|---|---|---|---|
| | | 300% | 500% | | |
| J | 60 | 470 | 1,495 | 2,790 | 635 |
| J | 75 | 463 | 1,485 | 2,910 | 630 |

The cured rubber stock containing the preferred class of materials was substantially neutral in color and the uncured stock showed no scorching when tested with a Williams Plastometer after heating for 360 minutes at substantially 200° F. Resistance to scorch or pre-vulcanization is a property sought in all accelerators of the vulcanization of rubber, but after normal vulcanization has taken place the physical properties of the cured rubber product should not be impaired. The data set forth in the above table show that desirable modulus and tensile properties are obtained by the use of the preferred class of materials and this property is rendered the more useful by the fact that the preferred materials are also resistant to pre-vulcanization.

Other ratios of the compounding ingredients than those mentioned in the examples hereinbefore set forth, as well as other well known fillers, pigments and the like may be employed in the production of various types of rubber compounds and are apparent to those skilled in the art to which the invention pertains.

The invention is limited solely by the following claims.

What is claimed is:

1. The process of vulcanizing rubber which comprises heating rubber and sulfur in the presence of a thiazole accelerator in an amount sufficient to materially accelerate the cure and an isothiohydantoin as an activator thereof.

2. The process of vulcanizing rubber which comprises heating rubber and sulfur in the presence of a mercapto aryl thiazole accelerator in an amount sufficient to materially accelerate the cure and an isothiohydantoin as an activator thereof.

3. The process of vulcanizing rubber which comprises heating rubber and sulfur in the presence of a mercapto aryl thiazole accelerator in an amount sufficient to materially accelerate the cure and an N-aryl isothiohydantoin as an activator thereof.

4. The process of vulcanizing rubber which comprises heating rubber and sulfur in the presence of a mercaptobenzothiazole accelerator in an amount sufficient to materially accelerate the cure and an isothiohydantoin as an activator thereof.

5. The process of vulcanizing rubber which comprises heating rubber and sulfur in the presence of a thiazole accelerator in an amount sufficient to materially accelerate the cure and isothiohydantoin as an activator thereof.

6. The process of vulcanizing rubber which comprises heating rubber and sulfur in the presence of a thiazole accelerator in an amount sufficient to materially accelerate the cure and 3 phenyl isothiohydantoin as an activator thereof.

7. The process of vulcanizing rubber which comprises heating rubber and sulfur in the presence of a thiazole accelerator in an amount sufficient to materially accelerate the cure and 2 phenyl imino 3 phenyl isothiohydantoin as an activator thereof.

8. The vulcanized rubber product produced by heating rubber and sulfur in the presence of a thiazole accelerator in an amount sufficient to materially accelerate the cure and an isothiohydantoin as an activator thereof.

9. The vulcanized rubber product produced by heating rubber and sulfur in the presence of a mercapto aryl thiazole accelerator in an amount sufficient to materially accelerate the cure and an isothiohydantoin as an activator thereof.

10. The vulcanized rubber product produced by heating rubber and sulfur in the presence of a mercapto aryl thiazole accelerator in an amount sufficient to materially accelerate the cure and an N-aryl isothiohydantoin as an activator thereof.

11. The vulcanized rubber product produced by heating rubber and sulfur in the presence of a mercaptobenzothiazole accelerator in an amount sufficient to materially accelerate the cure and an isothiohydantoin as an activator thereof.

12. The vulcanized rubber product produced by heating rubber and sulfur in the presence of a thiazole accelerator in an amount sufficient to materially accelerate the cure and isothiohydantoin as an activator thereof.

13. The vulcanized rubber product produced by heating rubber and sulfur in the presence of a thiazole accelerator in an amount sufficient to materially accelerate the cure and 3 phenyl isothiohydantoin as an activator thereof.

14. The vulcanized rubber product produced by heating rubber and sulfur in the presence of a thiazole accelerator in an amount sufficient to materially accelerate the cure and 2 phenyl imino 3 phenyl isothiohydantoin as an activator thereof.

DAVID J. BEAVER.